US00RE44149E

(19) United States
(12) Reissued Patent
Herbert et al.

(10) Patent Number: US RE44,149 E
(45) **Date of Reissued Patent: *Apr. 16, 2013**

(54) SYSTEM AND METHOD FOR DISPLAY DEVICE CHARACTERIZATION, CALIBRATION, AND VERIFICATION

(75) Inventors: Franz H. Herbert, Bregenz (AT); Dan Caldwell, Cardiff-by-the-Sea, CA (US); Robert Burnett, Carlsbad, CA (US)

(73) Assignee: Remote Director, LLC, Carlsbad, CA (US)

( * ) Notice: This patent is subject to a terminal disclaimer.

(21) Appl. No.: 12/462,410

(22) Filed: Aug. 4, 2009

Related U.S. Patent Documents

Reissue of:
(64) Patent No.: 6,937,249
Issued: Aug. 30, 2005
Appl. No.: 10/703,305
Filed: Nov. 7, 2003

U.S. Applications:
(62) Division of application No. 11/897,515, filed on Aug. 30, 2007, now abandoned.

(51) Int. Cl.
*G09G 5/00* (2006.01)

(52) U.S. Cl.
USPC ..... 345/581; 345/589; 345/590; 345/604; 345/591; 345/597

(58) Field of Classification Search ..... 345/581, 345/589, 590, 604, 591, 597
See application file for complete search history.

(56) References Cited

U.S. PATENT DOCUMENTS

| | | | | |
|---|---|---|---|---|
| 5,394,523 | A * | 2/1995 | Harris | 345/501 |
| 5,502,458 | A | 3/1996 | Braudaway | |
| 5,579,031 | A | 11/1996 | Liang | |
| 5,614,925 | A | 3/1997 | Braudaway | |
| 5,654,743 | A | 8/1997 | Hu et al. | |
| 5,786,908 | A * | 7/1998 | Liang | 358/518 |
| 6,078,936 | A | 6/2000 | Martin | |
| 6,081,254 | A | 6/2000 | Tanaka et al. | |
| 6,081,265 | A | 6/2000 | Nakayama | |
| 6,178,008 | B1 * | 1/2001 | Bockman et al. | 358/1.9 |
| 6,262,765 | B1 | 7/2001 | Jeong | |
| 6,292,228 | B1 | 9/2001 | Cho | |
| 6,381,343 | B1 | 4/2002 | Davis | |
| 6,480,299 | B1 * | 11/2002 | Drakopoulos et al. | 358/1.9 |
| 7,636,468 | B2 * | 12/2009 | Gibson et al. | 382/162 |
| 2002/0080168 | A1 * | 6/2002 | Hilliard et al. | 345/744 |
| 2002/0118210 | A1 * | 8/2002 | Yuasa et al. | 345/589 |
| 2002/0161659 | A1 | 10/2002 | Veilleux | |
| 2003/0020703 | A1 * | 1/2003 | Holub | 345/207 |
| 2003/0053001 | A1 * | 3/2003 | Murashita et al. | 348/649 |
| 2003/0128378 | A1 | 7/2003 | Cooper | |
| 2004/0001072 | A1 * | 1/2004 | Newman | 345/593 |

* cited by examiner

*Primary Examiner* — Mike Rahmjoo
(74) *Attorney, Agent, or Firm* — McNair Law Firm, P.A.; Douglas William Kim

(57) ABSTRACT

This invention is directed to a system and method for creating characterization information from a first display device that can be transmitted and used by a second display device. Computer readable instructions embodied in a computer readable medium calibrate a first display device, create an ICC color profile from said calibration information, storing the ICC color profile and sending the ICC color profile to a second display device for it to use. The calibration or characterization information can also be associated with an image file and sent to a second location for display.

7 Claims, 6 Drawing Sheets

SYSTEM AND METHOD FOR DISPLAY DEVICE CHARACTERIZATION, CALIBRATION, AND VERIFICATION

Matter enclosed in heavy brackets [ ] appears in the original patent but forms no part of this reissue specification; matter printed in italics indicates the additions made by reissue.

CROSS-REFERENCE TO RELATED APPLICATION

[This application] *More than one reissue application has been filed for the reissue of U.S. Pat. No. 6,937,249, which include reissue application numbers: Ser. No. 11/897,515 filed Aug. 30, 2007 now abandoned; Ser. No. 12/462,590 (a divisional application of Ser. No. 11/897,515) now U.S. Pat. No. 7,869,619; Ser. No. 12/462,591 (the present application, which is a second divisional application of Ser. No. 11/897,515) and Ser. No. 12/462,410 (a third divisional application of Ser. No. 11/897,515). U.S. Pat. No. 6,937,249* claims priority on corresponding utility patent application Ser. No. 10/647,641, entitled System for Selecting and Creating Composition Formulations, filed Aug. 25, 2003.

FIELD OF THE INVENTION

This invention is related to a system and method for characterization, calibration and verification of characterization and calibration information associated with display devices. Particularly, this invention is directed to a computerized system for characterizing or calibrating a display device, transmitting such characterization or calibration information to a second or subsequent display device, utilizing the characterization or calibration information to standardize the second or subsequent display device, and verifying that the characterization or calibration information can be appropriately utilized by the second or subsequent display device.

BACKGROUND OF THE INVENTION

Color decisions are made everyday in many aspects of commerce. When consumers purchase products, color can be a major influence on the purchasing decision. In modern commerce, there is the ability to purchase over the Internet or through other virtual means. This ability makes the accurate and precise display of color and color appearance even more important since such displays represent through presentation the color of physical products. It would be disappointing to the purchaser to purchase a product over the Internet under the belief that it was one color and receive the product only to discover that the color was not displayed properly when the product was purchased.

The ability to reproduce precise and accurate color in a display device is also important in the business of advertising, product packaging and product manufacturing. When such materials are being created, online virtual collaboration systems can be used to review and approve product prototypes and proofs of printed images such as described in U.S. Pat. No. 6,381,343. In these cases, it would be advantageous to use a system and method for calibrating display devices from a first display device to a second or subsequent location while also verifying that the second or subsequent display device can utilize the characterization information. Hence, when this information is properly applied, the color appearance of the product on the first device will be as close to identical as possible when viewed on a second or subsequent display device.

As such, providing a system and method that allows for the verification and calibration of display devices from a first display device to a second or subsequent display device is a problem that significant attention should be given.

To meet this need, it is an object of this invention to provide for a system and method for calibrating a second or subsequent display device according to characterization information of a first display device.

It is another object of this invention to provide a system and method for verifying characterization or calibration information of a second or subsequent display devices according to the characterization or calibration information of the first display device.

SUMMARY OF THE INVENTION

The above objectives are achieved by a system for creating characterization information for a first display device for use with a second display device made up of a computer readable medium in communications with the first display device; and, a set of computer readable instructions embodied in the computer readable medium. The set of computer readable instructions are for initializing lookup table values representing default luminance levels of the first display device, measuring the output of the first display device according to the initial lookup table values, determining a gray ramp according to the output measurements, mapping the gray ramp to L* of CIELAB color model of the first display device, adjusting the lookup table values according to the gray ramp mapping and L*, measuring RGB color map information, and determining an ICC profile according to said gray ramp and said RGB color map information.

The above objectives are further achieved by a system for utilizing characterization information from a first display device made up of a computer readable medium in communications with a second display device; and, a set of computer readable instructions embodied in the computer readable instructions for receiving characterization information representing the color characterization of the first display device, determining whether the second display device is able to utilize the characterization information, and using the characterization information for displaying images on the second display device.

The above objectives are further achieved by a system for calibrating a first display device, having at least one lookup table, made up of: a computer readable medium in communications with the first display device; and, a set of computer readable instructions embodied in the computer readable medium for initializing at least one lookup table of the first display device to default values according to a predetermined white point, measuring the output of the first display device using a display measuring device, modifying at least one lookup table according to the measured output until desired white point values are obtained, creating a gray ramp by mapping gray values from measurements of the first display device against L* of CIELAB color model, adjusting at least one lookup table according to the gray ramp, measuring the RGB color volume of the first display device, determining the gamut map of the first display device, and creating an ICC color profile according to the measured RGB color volume, gray ramp, at least one lookup table, and the gamut map.

The above objectives are further achieved by a method for creating characterization information for a first display device for use with a second display device. The methods consists of the steps of: initializing lookup table values of the first display device; measuring the output of the first display device resulting in display device measurements; determining a gray ramp according to the measurements; mapping the gray ramp to L* of the CIELAB color model; adjusting the lookup table values according to the gray ramp mapping; and, determining an ICC color profile according to the gray ramp and the adjusted lookup tables.

The above objectives are further achieved by a method for creating characterization information for a first display device for use with a second display device made up of the steps of: initializing lookup table values of the first display device; segmenting the first display device into a plurality of grid areas; measuring the output of at least one of the grid areas; determining a gray ramp according to the measurements; mapping the gray ramp to L* of the CIELAB color model; adjusting the lookup table values according to the gray ramp mapping; determining an ICC color profile according to the gray ramp and the adjusted lookup table values.

DESCRIPTION OF A PREFERRED EMBODIMENT

Figure 1:
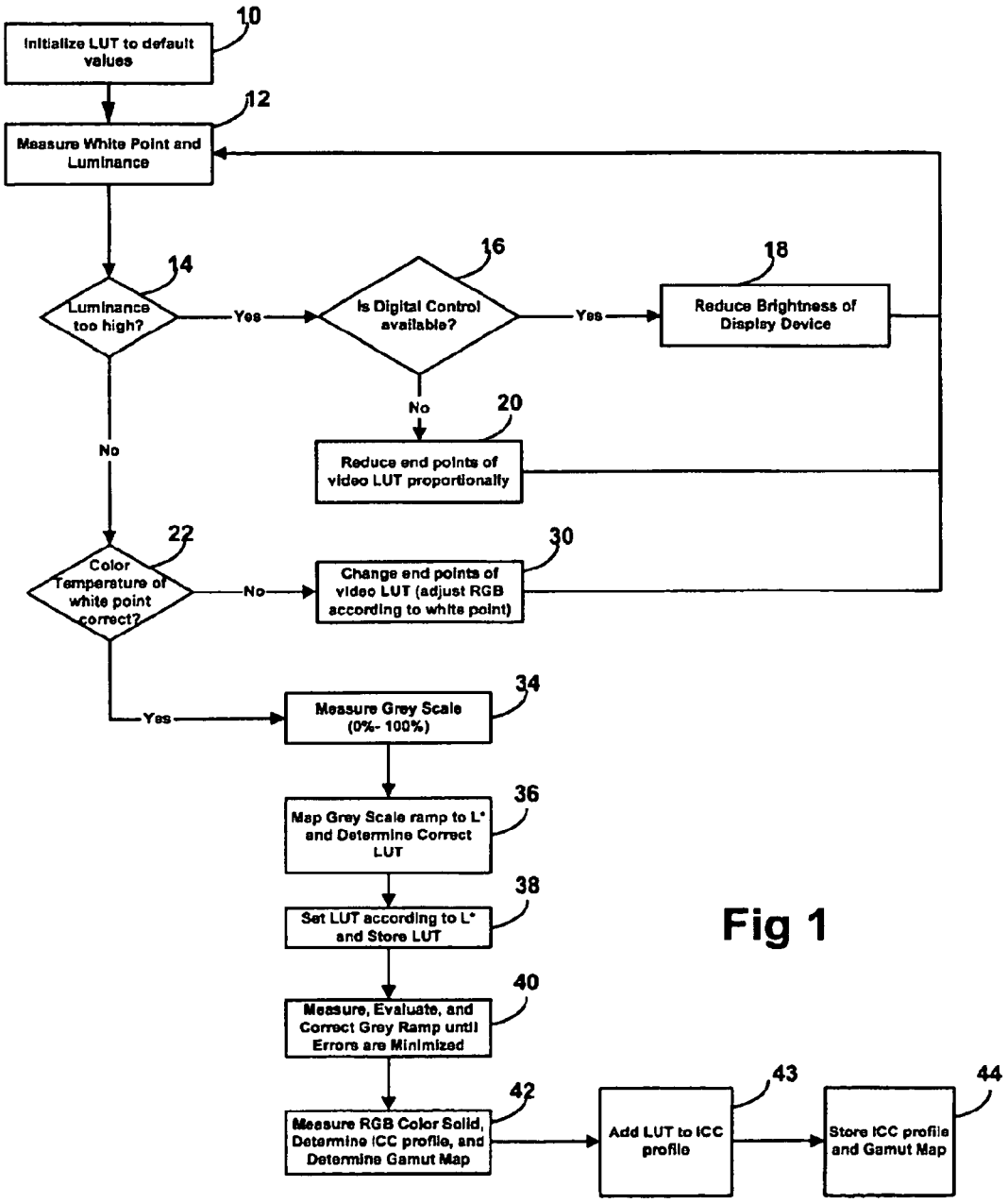
FIG. 1 is a flowchart of the invention.

The detailed description that follows may be presented in terms of program procedures executed on a computer or network of computers. These procedural descriptions are representations used by those skilled in the art to most effectively convey the substance of their work to others skilled in the art. These procedures herein described are generally a self-consistent sequence of steps leading to a desired result. These steps require physical manipulations of physical quantities such as electrical or magnetic signals capable of being stored, transferred, combined, compared, or otherwise manipulated readable medium that is designed to perform a specific task or tasks. Actual computer or executable code or computer readable code may not be contained within one file or one storage medium but may span several computers or storage mediums. The terms "host" and "server" may be hardware, software, or combination of hardware and software that provides the functionality described herein. This invention thereby allows multiple users, being geographically dispersed, to interact with data relating to physical characteristics of manufactured products using a system that ensures the precise and accurate conveyance of such information (data).

The present invention is described below with reference to flowchart illustrations of methods, apparatus ("systems") and computer program products according to the invention. It will be understood that each block of a flowchart illustration can be implemented by a set of computer readable instructions or code. These computer readable instructions may be loaded onto a general purpose computer, special purpose computer, or other programmable data processing apparatus to produce a machine such that the instructions will execute on a computer or other data processing apparatus to create a means for implementing the functions specified in the flowchart block or blocks.

These computer readable instructions may also be stored in a computer readable medium that can direct a computer or other programmable data processing apparatus to function in a particular manner, such that the instructions stored in a computer readable medium produce an article of manufacture including instruction means to implement the functions specified in the flowchart block or blocks. Computer program instructions may also be loaded onto a computer or other programmable apparatus to produce a computer executed process such that the instructions are executed on the computer or other programmable apparatus providing steps for implementing the functions specified in the flowchart block or blocks. Accordingly, elements of the flowchart support combinations of means for performing the special functions, combination of steps for performing the specified functions and program instruction means for performing the specified functions. It will be understood that each block of the flowchart illustrations' can be implemented by special purpose hardware based computer systems that perform the specified functions, or steps, or combinations of special purpose hardware or computer instructions. The present invention is now described more fully herein with reference to the drawings in which the preferred embodiment of the invention is shown. This invention may, however, be embodied in many different forms and should not be construed as limited to the embodiment set forth herein. Rather, these embodiments are provided so that this disclosure will be thorough and complete and will fully convey the scope of the invention to those skilled in the art.

Display devices can be calibrated in intensity, correlated color temperature, and response so that the same color appearance of a product manufactured is displayed and perceived by the viewer as if the product were located in the corresponding environment presented by a display device. Color intensity is the degree or depth of shade in a color. Color intensity is also known as Chroma in a Hue (color), Lightness, and Chroma (saturation) scale system; such as the Munsell Color Order system. Correlated color temperature is defined as the temperature of a black body that lies closest to the u',v' coordinate in the CIELUV system, of the isotemperature line perpendicular to the black body locus on the CIE XYY chromaticity diagram. The display devices are calibrated for multiple illuminants sequentially; such as: Daylight (D65) having a color temperature of 6500 degrees Kelvin; Fluorescent (F2) having a correlated color temperature of 4158 degrees Kelvin; and Tungsten having a color temperature of 2856 degrees Kelvin, so that color constancy is maintained when viewing the product to be manufactured under multiple illuminants. An illuminant defines the spectral power distribution of visible radiation emitted from a light source. Although the illuminants cited herein are typical of those used in the industry, it is to be understood that this invention may use many other illuminants or illuminant combinations. In the Graphic Arts industry, for example, the standard illuminant for proofing is D50 or a black body with a color temperature of 5,000 degrees Kelvin. Another component of the characterization procedure is the adjustment of the luminance or brightness level. Brightness level is the quality of being luminous, that is emitting light and its level influences color perception so that observations made on multiple monitors must be adjusted to the same luminance level to provide consistent evaluations. Brightness levels of greater than 200 cd/m$^2$ on the display devices are preferred. These properties of a display device can be referred to as the characterization information of that display device.

Figure 4:
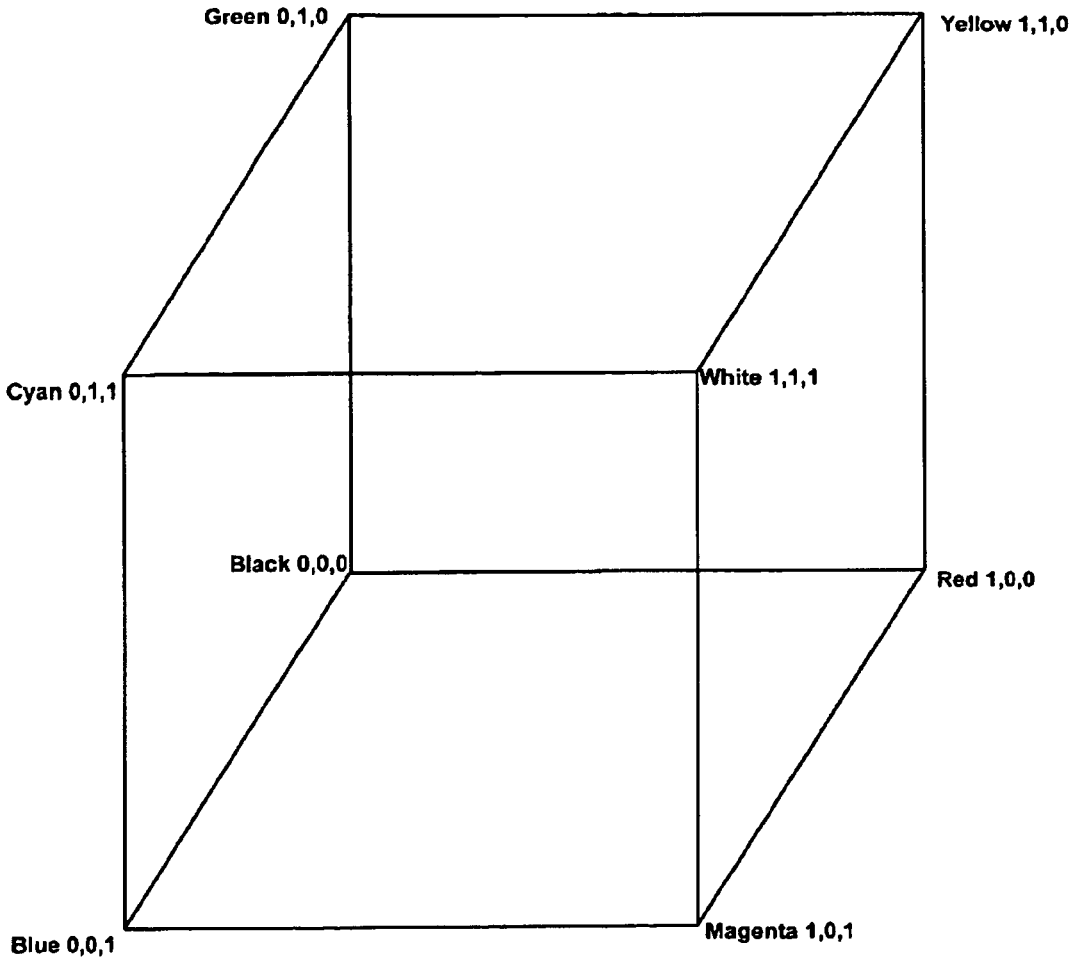
FIG. 4 is a schematic of RGB Color Space.

Referring now to FIG. 1, step 10 involves initializing the Video Lookup Table (LUT) to default values prior to measuring the white point. A LUT is a data structure that maps the gamut or color space of one device to the gamut of another device. The "white point" is the whitest white that an illuminant can produce in an illuminant dependent color space. For example, outdoors sunlight reflected off white generally serves as the white point for that illuminant. In a room at night, a single lamp's light reflected off white serves as the "white point" for that illuminant. A first display device is then measured by a spectrometer or calorimeter for a specified illuminant to determine the output of the display in step 12. The spectrometer or calorimeter is used as a display measuring device and measures or quantifies the relative output of the display device for any given input. In measuring the first display device, a spectral transfer function STF(VD1)(λ) is determined by measuring an RGB signal generated by the linear combination of RGB signals from 0,0,0 to 255, 255, 255 or 0 to 100% for each of RGB. If the luminance is too high at step 14, a determination is made as to whether digital control of the display device is available at step 16. If so, the brightness of the display device is reduced at step 18 and the operation returns to step 12. If digital control is not available at step 16, the end points of the LUT are reduced proportionally at step 20 and operation continues to step 12. If the luminance is not too high, a determination of color temperature for the white point is made at step 22. If the color temperature is not correct, the end points of the LUT are made by adjusting the RGB of the display device according to the white point at step 30. If the color temperature of the white point is correct, then a gray scale is measured at increments from black at zero percent to white at full scale, or one hundred percent, at step 34. A gray color can be generated as the RGB signals are incremented. A gray ramp is the series of colors from zero to full scale. Each new color, or incremented value of RGB, is slightly brighter than the last. An equivalent gray ramp is calculated using the CIELAB color model using the component parameter L*. L* accounts for the non-linearities in the human visual system helps linearizes these non-linear brightness/signal perceptions. At step 36, the invention maps the gray scale linearity against the lightness function L*. Step 38 sets the LUT according to the resultant values of the mapped gray scale and stores the results. The end points of the LUT are modified using the white point as a scalar value so that the total color difference is less than 0.2 unit, CIELAB ΔE*ab. The LUT is adjusted until the desired white point values are obtained from 0% black to 100% white. Step 40 measures, evaluates, and corrects the gray ramp linearity determinates until the errors are less than 0.2 units CIELAB ΔE*ab. In step 42, the RGB color solid is measured and the ICC profile is determined along with the gamut map. A gamut map is a solid that represents the obtainable colors producible by a device; such as a printer or a display device. Often these three-dimensional color solids, or maps that represent device dependent gamuts, are different; hence, when moving image data between devices that have different gamuts, a gamut-mapping algorithm is necessary to accommodate by mapping the out of gamut colors. At step 44, the ICC profile and gamut map are stored. For efficiency, the preferred embodiment measures 33 gray steps between 0% black and 100% white, representing full scale rather than the potential integer points from 0 to 100 at step 34. The 33 points corresponds to the approximate number of just noticeable differences in the component value L* of CIELAB. In a typical LUT, there are 256 (0 to 255) points between 0% black and 100% white. The values derived from these calibration procedures are stored in the LUT so that the input signal to the display device is modified thereby significantly reducing the errors in display devices. The display device is characterized or profiled by measuring a 3D color volume, which spans the RGB cube. The RGB cube is a representation of the RGB gamut in RGB color space. The cube is configured as a right hand co-ordinate system with XYZ mapping directly to RGB. The corners of the cube represent the primaries; Red (R), Green (G), and Blue, (B). The drawing of the RGB cube is shown in FIG. 4. Black is shown in the lower, rear, back corner with R=0%, G=0%, and B=0%. White is shown with R=100%, G=100%, and B=100%. For illustrative purposes, the number 1 is used to represent the full-scale signal which can also be assigned the value of 255 on a hex scale, or 100%. The data from the spectrometer or calorimeter is stored in the LUT. The resulting measurements are converted into a RGB→L*a*b*→RGB table at step 42. Additionally, a standard ICC display profile is created or edited at step 42 according to the RGB→L*a*b*→RGB table. The LUT is added to the ICC profile to provide a complete characterization of the display at that moment at step 43. The user of the system can also specify to calibrate the display device using a lower luminance in order to facilitate the viewing of images on other display devices of lesser quality and/or luminance capabilities. If so, steps 12 through 30 are repeated. This reduced luminance is achieved by iteratively reducing the white end of the Video Lookup Tables while maintaining the correlated color temperature of the desired illuminant, or in case the display device can be changed through programmatical means such as the DCC 2ci protocol by VESA, the brightness of the display is tentatively reduced while maintaining the corrected color temperature of the desired illuminant through gain controls. The resulting new luminance values are added to the ICC profile as additional information.

In many applications, such as for proofing sessions of digital images, new characterization settings for display devices are necessary. Therefore, the desired luminance is selected and the resulting ICC profile is associated with the proofing session or job. When that job is subsequently viewed, the prior characterization results are retrieved and loaded. A verification is performed by displaying a set of grays and colors on the display device, measuring the luminous output of the display device with the spectrometer or colorimeter, and comparing the measured results to the original measurements derived by calculating L*a*b* values using the RGB→L*a*b* interpolation table in the ICC profile. A standardized error metric called CIELAB ΔE*ab or CIELAB ΔE94 is used to compare the magnitude and assess the visual impact of the color differences.

In another application, it is desirable to simulate a CMYK print from a printing press or digital proof by displaying a corresponding digital image. In this case, a spectrometer measures a set of 300 to 2000 color patches. An ICC profile is created from this data. A set of tables from L*a*b*→CMYK→L*a*b* are created and form the basis of the resulting ICC printer profile for the respective device. This profile is selected in the viewing application and concatenated with the ICC display profile of the display device. Thus any CMYK value displayed can be converted to L*a*b* values and furthermore converted to display RGB values. It should be noted that color accuracy does also depend upon the gamut of the display device.

A second or subsequent display verification may also be performed by using a set of CMYK colors. The values for a CMYK color set are translated through the SWOP profile, first to CIELAB values and then to display RGB values. A SWOP profile is a recommended set of procedures for preparing proofing and printing for web offset publications. Verification of this defined printing condition assures both the creator and printer of the proof that the job will print as proofed. A CYMK profile is selected in the viewing application and concatenated with the ICC display profile of the display device. Thus any CMYK values displayed can be converted to an L*a*b* values and furthermore converted to display RGB values. The resulting RGB patches are displayed, measured, and compared to a set of previous measurements from a reference display. The differences in the resulting CIELAB ΔE*ab values determine how well the current display setup simulates the standard SWOP printing condition.

Once the first display device is calibrated, the characterization information can be transmitted to a second or subsequent display device in order to allow the second or subsequent display device the benefit of the characterization information of the first display device. Computer readable instructions at the second or subsequent display device can then inform the first display device whether the second or subsequent display device is capable of utilizing the characterization information from the first display device.

Figure 2:
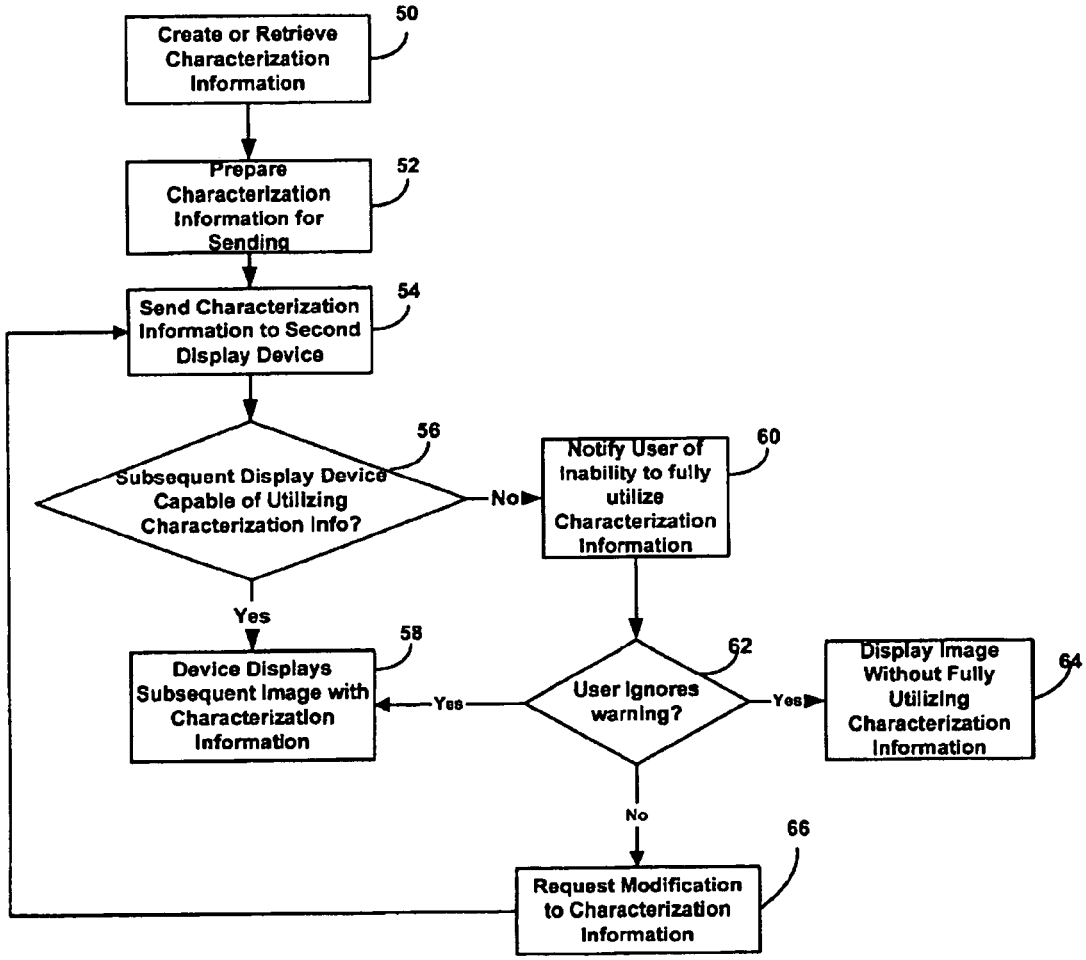
FIG. 2 is a flowchart of the invention.

Referring now to FIG. 2, characterization information is created or otherwise retrieved from a first display device at step 50. The characterization information, STF(VD1)(λ), is then prepared for transmission to a second or subsequent display device at step 52. The characterization is sent to the second or subsequent display device in step 54. The second or subsequent display device makes the determination as to whether the second or subsequent display device has the ability to utilize the characterization information from the first display device. In this case, the spectral transfer function of the first video display device is equal to the spectral transfer function of the second video display device so that STF(VD1)(λ)=STF(VD2)(λ). It is possible that the second or subsequent display device does not have sufficient capabilities to display all images correctly using the first display device's characterization information. Therefore the determination as to whether the second or subsequent display device can utilize the first display characterization information is made at step 56. If so, the second or subsequent display device can utilize the characterization information for displaying subsequent images at step 58. If the second or subsequent display cannot use the characterization information, the user of the second or subsequent display device is notified of this inability or limitation in step 60. The second or subsequent user can then choose to ignore the notification and subsequent images can be displayed at step 64. However viewing these images on an uncorrected display device may not be color accurate. If the user does not wish to ignore the notification, he can choose to calibrate the display using white point and luminance settings provided by the first display device as described herein. The user of the second or subsequent display device can notify the user of the first display device of this modality. Should the user of the second or subsequent display not be able to replicate the characterization of the first display device then the user of the first device can modify the characteristics of the first device so that the user of the second or subsequent device can properly and accurately view the image as displayed in step 66.

Figure 3:
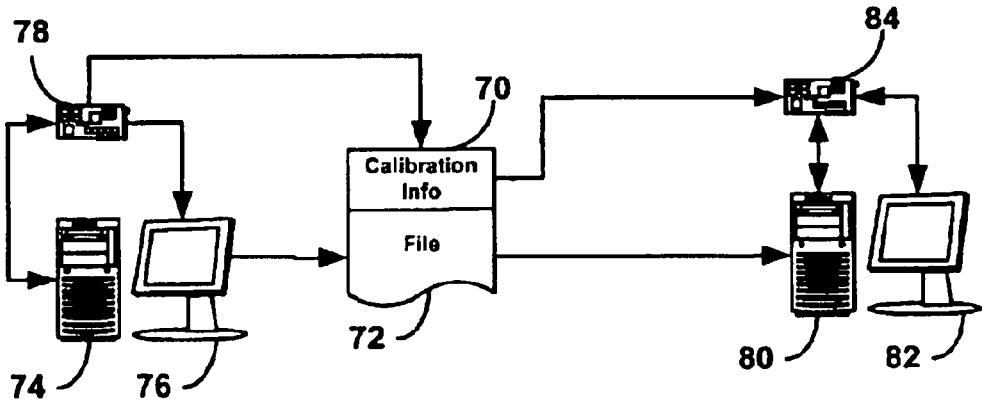
FIG. 3 is a schematic of the hardware associated with the invention.

In an alternative embodiment, the characterization information 70 (FIG. 3) can be attached to the images 72 to be displayed so that the characterization information travels to a second or subsequent display devices along with the image file. It should be noted that characterization information as well as display properties can be associated with files for transmission to second or subsequent or subsequent display devices. An author of an electronic image or other electronic document uses an author's computer 72 to create a computer readable file 72. This file is displayed for viewing by the author on author's display 76 that is controlled by author's video card 48. The visual appearance of this file is determined by the gamma, white point, and profile for the display in the author's computer 74. The author, therefore, creates the file having specific display properties or characterizations so as to achieve the desired appearance of the file for a viewer. Therefore, author's monitor 76 and author's video card 78 would have certain settings for display properties and characterizations that are used to determine the appearance of the file. The display properties or characterizations are represented as a set of computer readable information shown as display information 70 that can be associated with the file. When the file is transmitted to a recipient, the display or characterization information, associated with the file, can be transmitted to the recipient viewer with the file. Therefore, the display properties or characterizations are associated with the file and are available to any subsequent recipient viewer when receiving the file from the author.

The recipient would receive file 72 using recipient's computer 80. The file can be displayed on the recipient's monitor 82 that is controlled by recipient's video card 84. However, recipient's monitor 82 and recipient's video card 84 may not necessarily contain the proper display settings or characterizations to reflect the contemplated display properties for the file by the author. Therefore, the recipient viewer who wishes to view the file in the same manner as the author intended would not have the proper display properties or characterizations for the recipient's video card or monitor. To remedy this problem, computer readable instructions embodied within a computer readable medium of the recipient's computer 80 can read display information 70 associated with file 72 and can adjust recipient's display settings and profile for the video card 84 and recipient's video monitor 82 so as to provide the color appearance of an image as intended by the author. Therefore, the recipient can view the image with the appropriate video card and monitor settings to help ensure that the recipient views the same displayed information that was created by the author.

Upon receiving display or characterization information 70, the set of computer readable instructions would determine if the recipient's video card or monitor settings are in need of adjustment. In the event that adjustments are necessary according to the display information, several methods of adjustment can be used. In one embodiment, the adjustments can be made without notification to the recipient and simply be automatically performed by the computer readable instructions of the recipient's computer. In this case, the computer readable instructions can store the original display properties of the recipient's video card and monitor, adjust them according to the received display information, and restore the original display properties when the file is no longer viewed by the recipient. Further, the set of computer readable instructions can inform the recipient viewer that the data in the recipient's video card and monitor are in need of modification according to the received display properties and inquiry as to whether the recipient viewer wishes to have such modifications implemented. If so, the modifications are implemented and the file is viewed with such modifications.

In another embodiment, the computer readable instructions have instructions for calibrating the display device on a sector by sector basis. When manufactured, display devices may not have a consistence luminance or output across all areas of the screen. Therefore, the display device can be segmented into grid areas and each grid area can be calibrated.

Figure 6:
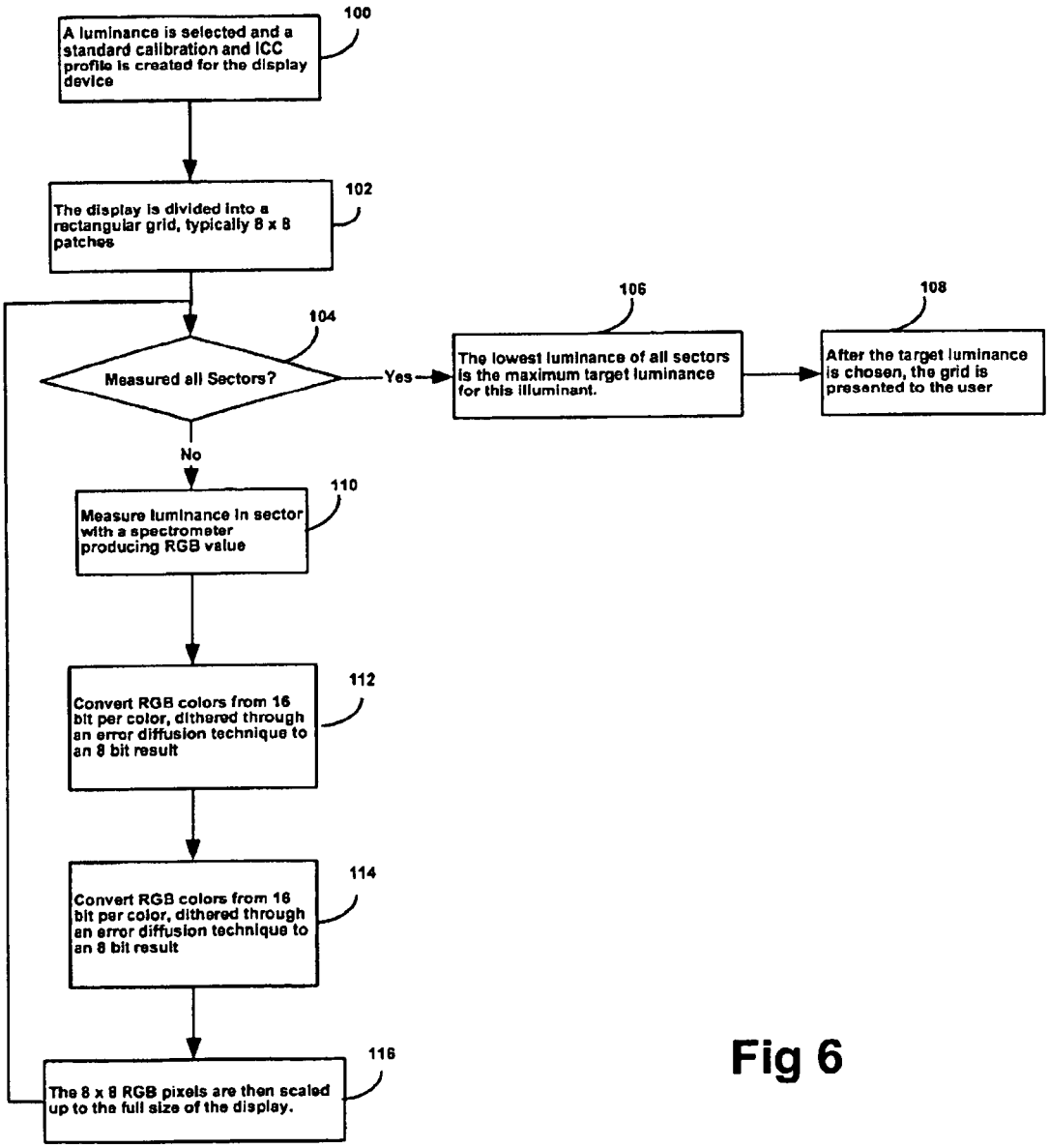
FIG. 6 is a flowchart of the invention.

Referring to FIG. 6, this aspect of the invention is explained in more detail. A luminance is selected and a standard calibration and ICC profile is created for the display device at step 100 and as described herein. The display device is then logically divided into a plurality of grid areas such as in an eight by eight grid at step 102. A determination is made as to whether all of the grid areas have been measured at step 104. If all grid areas have been measured, the lowest luminance of each grid area is the maximum target luminance for the display device as determined in step 106. After the target luminance is chosen, the grid is presented to the user.

Figure 5:
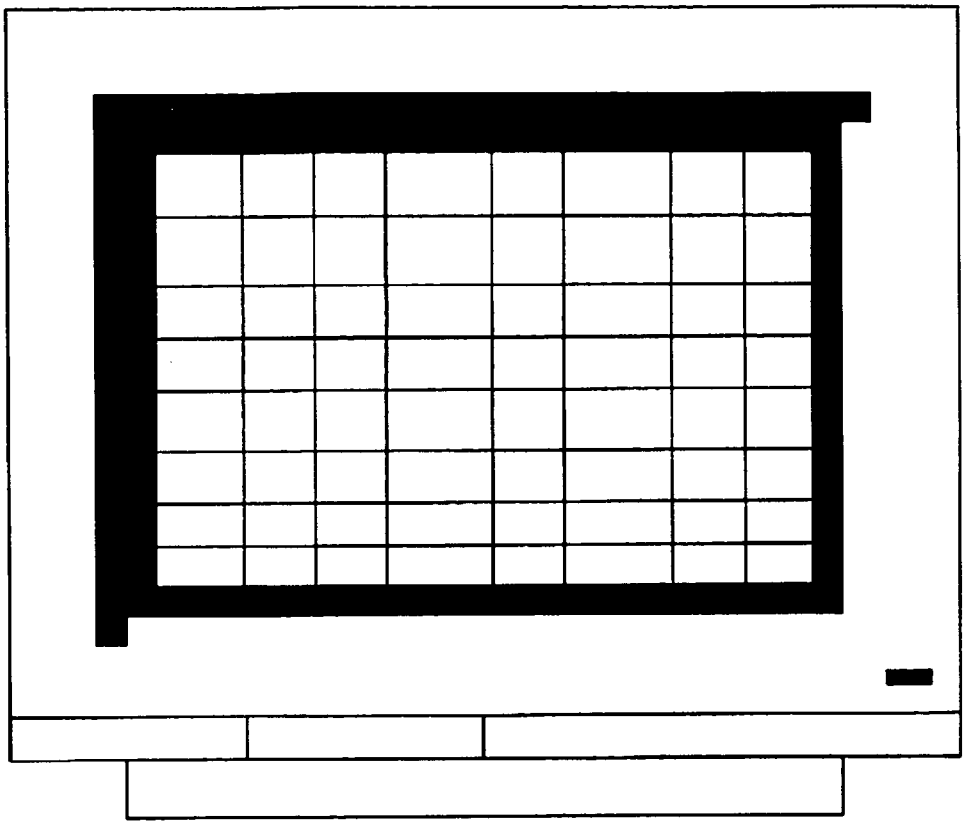
FIG. 5 is a schematic of grid areas of a display device.

If all of the grid sectors have not been measured at step 104, the next grid area to be measured is measured with a display measuring device at step 110 resulting in RGB values. The RGB values are converted from a 16 bit per color format and dithered through an error diffusion process to result in an 8 bit result at step 112. The grid area measured is then scaled from the grid area to the entire area of the display device at step 114. Referring to FIG. 5, an 8×8 grid is shown with 64 grid areas illustrated.

The numerous details set forth herein are provided to facilitate the understanding of the invention and are not provided to limit the scope of the invention. Accordingly, the disclosure of embodiments of the invention is intended to be illustrative of the scope of the invention and is not intended to be limiting. It is intended that the scope of the invention shall be limited only to the extent required by the appended claims.

What is claimed is:

[1. A system for creating characterization information for a first display device for use with a second display device comprising:

a computer readable medium in communications with said first display device; and, a set of computer readable instructions embodied in computer readable medium for initializing lookup table values representing default luminance levels of said first display device, measuring the output of said first display device according to said initial lookup table values, determining a gray ramp according to said output measurements, mapping said gray ramp to L* of CIELAB color model of said first display device, adjusting said lookup table values according to said gray ramp mapping and L*, measuring RGB color map information, and determining an ICC profile according to said gray ramp and said RGB color map information.]

[2. The system of claim 1 wherein said computer readable instructions include instructions for transmitting said ICC profile of said first display device to said second display device so that said second display device can display images using said ICC profile.]

[3. The system of claim 1 wherein said computer readable instructions include instructions for determining whether said lookup table values represent a luminance level exceeding a predetermined level and reducing said luminance level of said first display device if said lookup table values represent a luminance level exceeding a predetermined level.]

[4. The system of claim 1 wherein said computer readable instructions include instructions for determining whether the color temperature at a white point associated with said lookup table values is correct and modifying said lookup table values according to said color temperature of said white point if said color temperature is correct.]

[5. The system of claim 1 wherein said computer readable instructions include instructions for determining the gamut map of said first display device and including said gamut map within said ICC color profile.]

[6. The system of claim 1 wherein said computer readable instructions include instructions for measuring said gray ramp at approximately 33 distinct intervals between 0% black and 100% white.]

[7. The system of claim 1 wherein said computer readable instructions include instructions for storing said ICC profile in a computer readable storage medium, subsequently retrieving said stored ICC profile of said first display device, and verifying said retrieved ICC profile by comparing measured luminance of said display device using said retrieved ICC profile with said measurements used when initial creating said retrieved ICC profile.]

[8. The system of claim 1 wherein said computer readable instructions include instructions for creating CMYK information by measuring color patches of said first display device, creating CMYK ICC profile information from said measurements, and determining a L*a*b*-CMYK-L*a*b* table from said measurements representing characterization information of said first display device.]

[9. The system of claim 1 wherein said computer readable instructions include instructions for associating said characterization information with an image file and transmitting said image file and said associated characterization information to said second display device so that characterization information of said first display device is transmitted with said image information to be displayed.]

[10. A system for calibrating a first display device, having at least one lookup table, comprising:

a computer readable medium in communications with said first display device; and, a set of computer readable instructions embodied in said computer readable medium for initializing said at least one lookup table of said first display device to default values according to a predetermined white point, measuring the output of said first display device using a display measuring device, modifying said at least one lookup table according to said measured output until desired white point values are obtained, creating a gray ramp by mapping gray values from said measurements of said first display device against L* of CIELAB color model, adjusting said at least one lookup table according to said gray ramp, measuring the RGB color volume of said first display device, determining the gamut map of said first display device, and creating an ICC color profile according to said measured RGB color volume, said gray ramp, said at least one lookup table, and said gamut map.]

[11. The system of claim 10 wherein said computer readable instructions included instructions for associating said ICC color profile with a specific job and storing said ICC profile associated with said specific job for subsequent retrieval so that said ICC profile can be subsequently used when said specific job is later retrieved for further work or review.]

[12. The system of claim 10 wherein said computer readable instructions include instructions for transmitting said ICC color profile to a second display device so that said second display device can utilize said ICC color profile of said first display device for displaying images.]

[13. The system of claim 10 wherein said computer readable instructions include instructions for storing said ICC color profile of said first display device, retrieving said ICC color profile of said first display device, displaying a set of gray colors on said first display device, measuring said first display device with said display measuring device, and comparing said measured values from said display measuring device with said ICC color profile in order to validate the retrieved ICC profile of said first display device.]

[14. The system of claim 10 wherein said computer readable instructions include instructions for storing said ICC color profile of said first display device, retrieving said ICC color profile of said first display device, displaying at least one CMYK image using said retrieved ICC color profile, measuring color patches with said display measuring device according to said displayed CMYK image, converting said measurements from measuring said color patches to RGB information, displaying said color patches according to said converted RGB information, measuring said displayed color patches according to said converted RGB information and comparing said measurements of said CMYK color patches to said RGB color patches to verify said retrieved ICC color profile.]

[15. A method for creating characterization information for a first display device for use with a second display device comprising the steps of:

initializing lookup table values of said first display device;

measuring the output of said first display device resulting in display device measurements;

determining a gray ramp according to said measurements;

mapping said gray ramp to L* of the CIELAB color model;

adjusting said lookup table values according to said gray ramp mapping; and, determining an ICC color profile according to said gray ramp and said adjusted lookup tables.]

[16. The method of claim 15 including:

measuring an RGB color map; and, determining an ICC color profile according to said measured RBG color map.]

[17. The method of claim 15 including transmitting said ICC profile to said second display device.]

[18. The method of claim 17 including:

determining the gamut map of said first display device; and, including said gamut map within said ICC color profile.]

[19. The method of claim 15 including:

storing said ICC color profile;

retrieving said ICC color profile;

comparing said luminance of said first display using said retrieved ICC profile with said measurements used when determining said ICC color profile.]

[20. The method of claim 15 including:

associating said ICC color profile with an image file;

transmitting said ICC color profile with said image file to said second display device so that said second display device can display said image with said ICC color profile.]

[21. A method for creating characterization information for a first display device for use with a second display device comprising the steps of:

initializing lookup table values of said first display device;

segmenting said first display device into a plurality of grid areas;

measuring the output of at least one said grid area;

determining a gray ramp according to said measurements;

mapping said gray ramp to L* of the CIELAB color model;

adjusting said lookup table values according to said gray ramp mapping;

determining an ICC color profile according to said gray ramp and said adjusted lookup table values.]

[22. The method of claim 21 including:

measuring an RGB color map for at least one of said grid areas; and, determining an ICC color profile according to said RGB color map for at least one of said grid areas.]

*23. A system for verifying whether a second display device can correctly display an electronic image received from a first display comprising:*

*a first computer readable non-transitory medium in communications with said first display device;*

*a second computer readable non-transitory medium in communications with said second display and said first computer readable medium;*

*an electronic image stored in an electronic image file on said first computer readable non-transitory medium having L* values associated with said electronic image;*

*a set of first computer readable instructions embodied in said first computer readable non-transitory medium for retrieving said electronic image file from said first computer readable medium, retrieving said L* values from said first computer readable medium, retrieving a grey ramp from said first computer readable medium, mapping said L* values to said grey ramp of said first display device thereby creating characterization values, attached said characterization values to said electronic image file and transmitting said electronic image file with said characterization values to said second computer readable non-transitory medium; and,*

*a set of second computer readable instructions embodied in said second computer readable non-transitory medium for receiving said electronic image file and said characterization values and determining whether said second display device can correctly display said electronic image according to said characterization values.*

*24. The system of claim 23 including:*

*color temperature values stored in said first computer readable non-transitory medium and associated with said electronic image;*

*said first set of computer readable instructions include instructions for retrieving said color temperature values and transmitting said color temperature values to said second computer readable non-transitory medium; and,*

*said second set of computer readable instructions include instructions for receiving said color temperature values and determining whether said second display device can correctly display said electronic image according to said color temperature values.*

*25. The system of claim 24 wherein said second computer readable instructions include instructions for transmitting a message to said first computer readable non-transitory medium representing that said second display device cannot correctly display said electronic image according to said color temperature values.*

*26. The system of claim 24 wherein said first computer readable instructions include instructions that when executed by a processor performing the steps of determining whether color temperature values of said first display device were used to display the image on said second display device, determining if said color temperature values exceed color temperature values capable of being displayed by said second display device and displaying a warning that said color temperature values exceed said color temperature values capable of being displayed by said second display device.*

*27. The system of claim 23 wherein said first computer readable instructions include instructions for measuring said grey ramp at approximately 33 distinct intervals between 0% black and 100% white.*

*28. The system of claim 23 wherein said first computer readable instructions include instructions that when executed by a processor perform the steps of determining whether*

*characterization values of said first display device can be used to display said electronic image on said second display device, determining if said characterization values exceed characterization values capable of being displayed by said second display device and displaying a warning that said characterization values exceeds said characterization values capable of being displayed by said second display device.*

*29. The system of claim 23 wherein said second computer readable instructions include instructions for transmitting a message to said first computer readable non-transitory medium representing that said second display device cannot correctly display said electronic image according to said characterization values.*

* * * * *